United States Patent
Leiba et al.

(10) Patent No.: US 9,043,440 B2
(45) Date of Patent: May 26, 2015

(54) AUTOMATIC WSDL DOWNLOAD OF CLIENT EMULATION FOR A TESTING TOOL

(75) Inventors: Anna Leiba, Yehud (IL); Nir Hemed, Yehud (IL); Dmitry Markuza, Yehud (IL); Yaron Yaron, Yehud (IL); Avishai Moshka, Yehud (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 140 days.

(21) Appl. No.: 12/970,764

(22) Filed: Dec. 16, 2010

(65) Prior Publication Data

US 2012/0158911 A1 Jun. 21, 2012

(51) Int. Cl.
*G06F 15/16* (2006.01)
*H04L 12/24* (2006.01)
*H04L 12/26* (2006.01)

(52) U.S. Cl.
CPC ............ *H04L 41/5096* (2013.01); *H04L 43/50* (2013.01)

(58) Field of Classification Search
CPC ..... H04L 41/5096; H04L 43/50; H04L 67/02; H04L 67/025; H04L 67/16; H04L 29/0617
USPC ......... 709/219, 220–222, 245, 232, 227–229, 709/217, 224; 717/124, 127, 134
See application file for complete search history.

(56) References Cited

U.S. PATENT DOCUMENTS

| | | | |
|---|---|---|---|
| 7,028,223 B1 * | 4/2006 | Kolawa et al. | 714/38.14 |
| 7,908,590 B1 * | 3/2011 | Min et al. | 717/124 |
| 2003/0120464 A1 * | 6/2003 | Taft et al. | 702/186 |
| 2004/0060057 A1 * | 3/2004 | Hansen et al. | 719/328 |
| 2005/0154785 A1 * | 7/2005 | Reed et al. | 709/217 |
| 2006/0136351 A1 * | 6/2006 | Angrish et al. | 707/1 |
| 2006/0277606 A1 * | 12/2006 | Yunus et al. | 726/25 |
| 2008/0195483 A1 * | 8/2008 | Moore | 705/14 |
| 2009/0006897 A1 * | 1/2009 | Sarsfield | 714/38 |
| 2009/0125612 A1 * | 5/2009 | Rabetge et al. | 709/220 |
| 2009/0282136 A1 * | 11/2009 | Subramanian | 709/222 |
| 2012/0072826 A1 * | 3/2012 | Sherkin | 715/234 |

OTHER PUBLICATIONS http://www.soapui.org/userguide/monitor/index.html SOAP UI Published on Jul. 4, 2008.*
Merriam-Webster (Heuristics-Definition, Dec. 19, 2013, http://www.merriam-webster.com, Dec. 19, 2013).*

* cited by examiner

*Primary Examiner* — Liangche A Wang
*Assistant Examiner* — Abdulkader M Alriyashi
(74) *Attorney, Agent, or Firm* — Pearl Cohen Zedek Latzer LLP

(57) ABSTRACT

A method is disclosed which may include analyzing communication requests in a business process between a client and a server offering a service application to be tested. The method may further include identifying a call to a web service in the analyzed communication. The method may also include determining a location of a Web Service Description Language (WSDL) file relating to the web service on a remote server and downloading the WSDL file from the determined location. A computer readable medium having stored thereon instructions for performing the method and a computer system are also disclosed.

22 Claims, 5 Drawing Sheets

AUTOMATIC WSDL DOWNLOAD OF CLIENT EMULATION FOR A TESTING TOOL

BACKGROUND

Web Services are widely used in modern applications. The term "web service" usually refers to an application programming interface (API) which is accessed and executed on a remote server, which hosts the requested service.

A load testing tool is software designed to examine an application behavior under various load conditions. The testing tool can emulate numerous concurrent users to simulate real-life loads on the tested application. When doing so, the testing tool collects information from various infrastructure components (e.g. system servers), which is analyzed. HP's LoadRunner typically may include several different tools: Virtual User Generator (VuGen), Controller, load generators, Analysis and Launches.

When automatically recording any business process in a load testing tool, such as, for example, LoadRunner™—a popular load testing application available from Hewlett Packard Inc (HP)—various Web Service calls may be found in that process.

Currently, when using LoadRunner and finding a Web Service call the appropriate Web Service Description Language (WSDL) is downloaded manually. WSDL may be an Extensible Markup Language (XML) format for describing network services as a set of endpoints operating on messages containing either document-oriented information or procedure-oriented information. The automation user also has to manually configure the request settings such as security. In the protocols-heavy domain of web services (for example WS-Security, WS-Addressing) this is a major overhead.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings. It should be noted that the figures are given as examples only and in no way limit the scope of the invention. Like components are denoted by like reference numerals.

DETAILED DESCRIPTION

Figure 1:
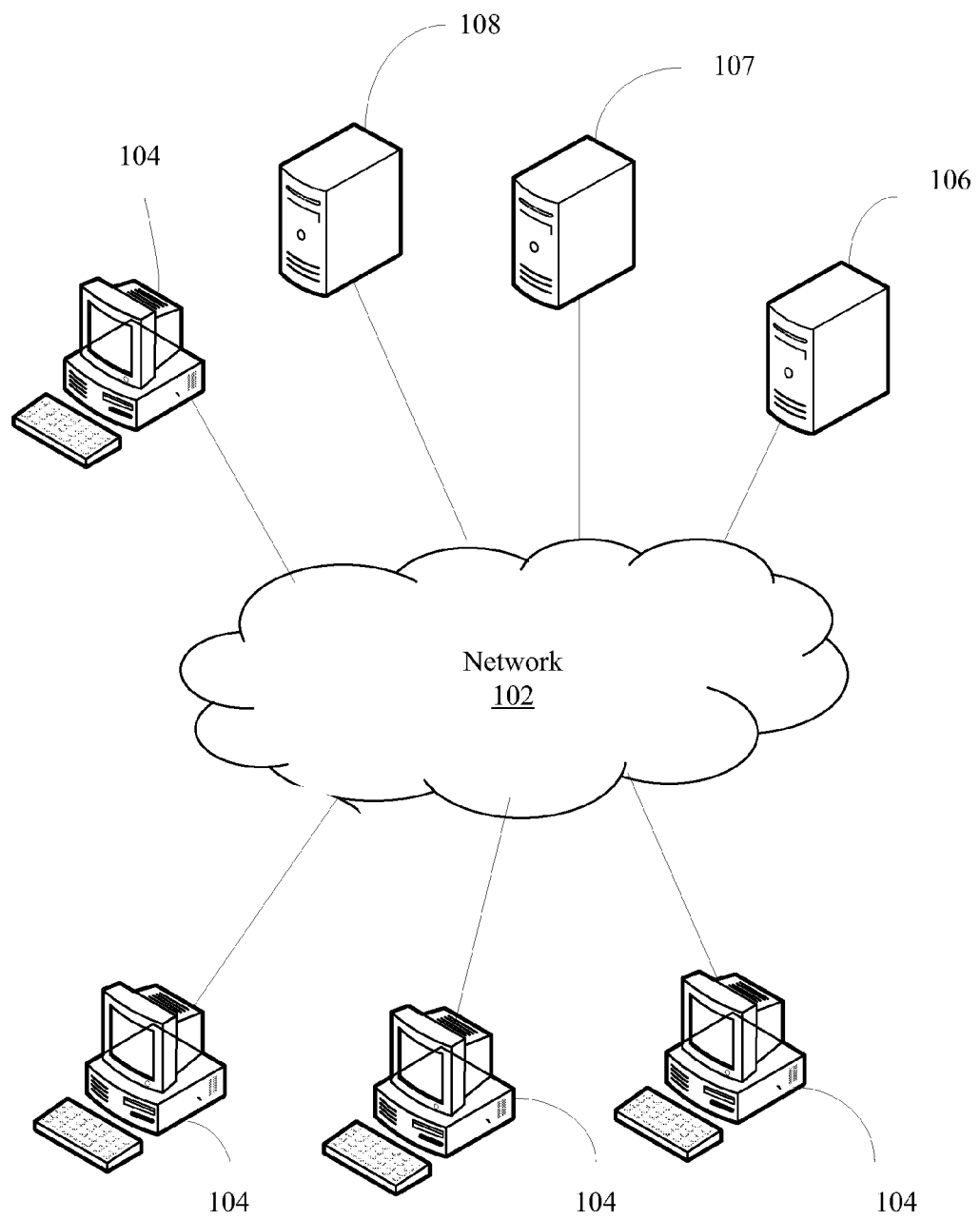
FIG. 1 illustrates an environment of a testing tool for a server in a network, in accordance with an embodiment of the present invention.

In accordance with an embodiment of the invention, when using a testing tool, such as, for example, HP's LoadRunner, for business processes monitored in a transport level script, it is suggested to analyze communication requests in a business process between a client and a server offering a service application to be tested. A call to a web service may be identified in the analyzed communication and a location of a Web Service Description Language (WSDL) file relating to the web service on a remote server may be determined from the analyzed communication requests. A WSDL file may be then automatically downloaded from the determined location.

"Transport level script" refers to script which accesses various networked facilities.

Furthermore, it is further suggested to perform automatic configuration of a client emulation to properly work with the application under test (AUT), e.g. configuration settings such as encoding and security settings.

Previously a user would download WSDL files manually and then configure the client emulation so as to facilitate proper use of the WSDL files. Manual downloading and configuring of WSDL requires considerable understanding of Web Services. According to an embodiment of the invention WSDL files may be automatically downloaded.

When a testing tool monitors a business process in transport level, it may capture communication messages passing between the client and the server. These messages may be expressed in a script or a similar entity, which may later be used for simulating the business process by the testing tool using a client emulation.

Commonly, users of the testing tool may manually modify the recorded script for various reasons, such as, for example, correlation and parameterization, but also inserting client side logic to the script, maintaining existing script to support changes of the application, etc.

Therefore, offering the users the ability to modify the script and the readability of the script may be desired.

In general, a script that uses higher level API or terminology is more usable and easy to manipulate.

Web Service calls may be expressed in the script in HTTP level (i.e. by API for handling HTTP messages) or in Web Services level. Working in Web Service level may require the WSDL file of the service.

Web Service level is typically a higher and more usable level. Configuration may be made in service level instead of message level. There is usually no need to modify each message, just the service configuration. Web Service attributes may be expressed as entities and not as a set of Simple Object Access Protocol (SOAP) headers. Also, some security mechanisms like message level security may not be able to simulate in HTTP level, because the relevant SOAP headers are generated dynamically. In addition, working in service level may have the code efficiency advantage that a service proxy may be used for generating the service calls. One of the main proclaimed objects of automatic testing tools is the "record and replay" ability, e.g. simulating the business process after recording it with minimum intervention of the user.

The configuration of the client is complicated and requires wide understanding of Web Services technology. For example, in LoadRunner there are tens of options that the user would have to configure manually. Manual work takes time, and is more prone to mistakes. It requires a wide understanding of Web Services technology that application testers do not usually possess.

According to an embodiment of the invention "record and replay" in service level may be offered.

WSDL may be located and downloaded automatically, for example, in the following manner.

An HTTP message to a web service (WS) server may be captured. The message may be analyzed and heuristics may be employed to find the location of the web service. For example, the location of the web service may be determined from a destination indication of the message or from other parts of the message allowing the determination of the WS location.

The following exemplary scripts relate to Silverlight Web Services (embodiments of the invention may be applicable to other platforms as well):

A. the string "?wsdl" may be added to an endpoint. For example: "http://<host name>/<folders>/<service name>" may be amended to "http://<host name>/<folders>/<service name>?wsdl".

B. the string "?wsdl" may be appended after the service name in the end point. For example, "http://<host name>/<folders>/<service name>/<port>" may be amended to "http://<host name>/<folders>/<service name>?wsdl".

For example, the service MEX (Metadata Exchange) endpoint (http://msdn.microsoft.com/enus/library/ms730243.aspx), may be used, running SvcUtil.exe one to obtain service\endpoints locations. In addition, the user may be offered the possibility of manually specifying the WSDL. A local cache may be kept at machine level of previously downloaded WSDL files. When the endpoint is identified from the recorded envelope one may choose the best source for the WSDL, for example, by applying heuristics.

Once the WSDL files are successfully downloaded one may analyze the HTTP message and determine the attributes used by the client in order to properly configure the client.

For example, in Web Services created in Silverlight platform it may be possible to identify which port is used in each request—by matching the HTTP message endpoint to the endpoints of the ports which are specified in the WSDL. It may also be possible to encode binary XML or plain text identified by its HTTP content type.

Additional examples for attributes that may be detected by the corresponding SOAP headers, e.g. duplex binding, Web Service addressing version, authentication mode User-NameOverTransport authentication mechanism (such as used in Silverlight).

Similarly, other attributes may be treated.

According to embodiments of the present invention, Soap messages which may be captured on the wire may be analyzed. This may allow presenting a standards-free request and automatically configure the replay.

For example, consider a client (e.g. Silverlight client) who wants to send a plain XNL message containing the number "42" to a server ("logical message"). Such message may be in the following form (binary encoding is omitted for clearness, this envelope is very simplified and does not necessarily reflect how any of the standards appear in a SOAP):

```
<envelope>
    <timestamp>2010-10-18T13:12:53Z</time>
    <id>730ee669-489e-89ab-8603be9b</id>
    <user>Michael</user>
    <data>42</data>
</envelope>
```

The logical message is in fact a "data" element (42).

The message may be subjected to WS standards. The process of applying these standards may involve applying an algorithm on the logical message. The result of applying the algorithm on the logical message is an opaque message which is communicated to the WS server (the above example message).

Using deep domain knowledge and heuristics the logical message may be extracted and the algorithm which the real client applied may be reconstructed.

According to embodiments of the present invention a tester may now independently edit the logical message or the algorithm using an editor.

During replay, the algorithm may be applied on the logical message, ensuring that server policies are satisfied. This may also refresh any stale or dynamic data (e.g. timestamps, IDs).

There may be no generic way of identifying each algorithm step applied on a message nor reverting the message to its state prior to applying the algorithm on it. Each protocol may have its own set of structures and formats. For example, identifying WS-addressing headers may require querying the message with an XPath expression. In contrast, pinpointing an exact WS-Security configuration may require a correlation between different parts of a message, between a request and its response, and sometimes even between multiple correspondences. For example, when WS-SecureConversation is applied, multiple messages may be exchanged and, only after the last request-response pair, may one fully identify the use of derived encryption keys or signatures.

In terms of metadata, an embodiment of the present invention may be described as follows:

The client may send a message on the wire to the web service server. This message may be a standalone message that does not have any metadata inside it or linked to it.

During code generation heuristics may be used to find the metadata (WSDL) which corresponds to this message. These heuristics may be based, for example on keeping a machine-wide cache for WSDLs, guessing the metadata address based on the destination URL, trying to download it, and/or parsing HTML error messages which the server renders after a false guess.

Now the logical message may be linked to its metadata. This may give the tester a rich set of capabilities such as data-driving, schema-aware data editing, and refreshing the metadata on-demand.

Once the attributes of the intercepted message are determined the client may be configured accordingly.

The automation offered by embodiments of the present invention may save work time of downloading and configuring the services. Also, it may reduce the number of errors that may occur in a manual process. Manual configuration requires wider understanding of Web Services technology, including security and authentication aspects, standards, encoding and so on, which automated configuration may eliminate or greatly reduce.

FIG. 1 illustrates an environment of a testing tool for a server in a network, in accordance with an embodiment of the present invention.

AUT server 106 is designed to service remote clients 104 with an application which is mostly or fully executed on that server.

In the process a remote Web Service may be required, which is hosted on remote WS server 108. Clients 104 may download the appropriate WSDL files from remote WS server 108 so as to allow them to properly cooperate with the AUT server 106.

A testing tool, which may be executed on another server 107 may monitor a business process of client 104 and may emulate a plurality of clients so as to simulate real-life load scenarios.

Figure 2:
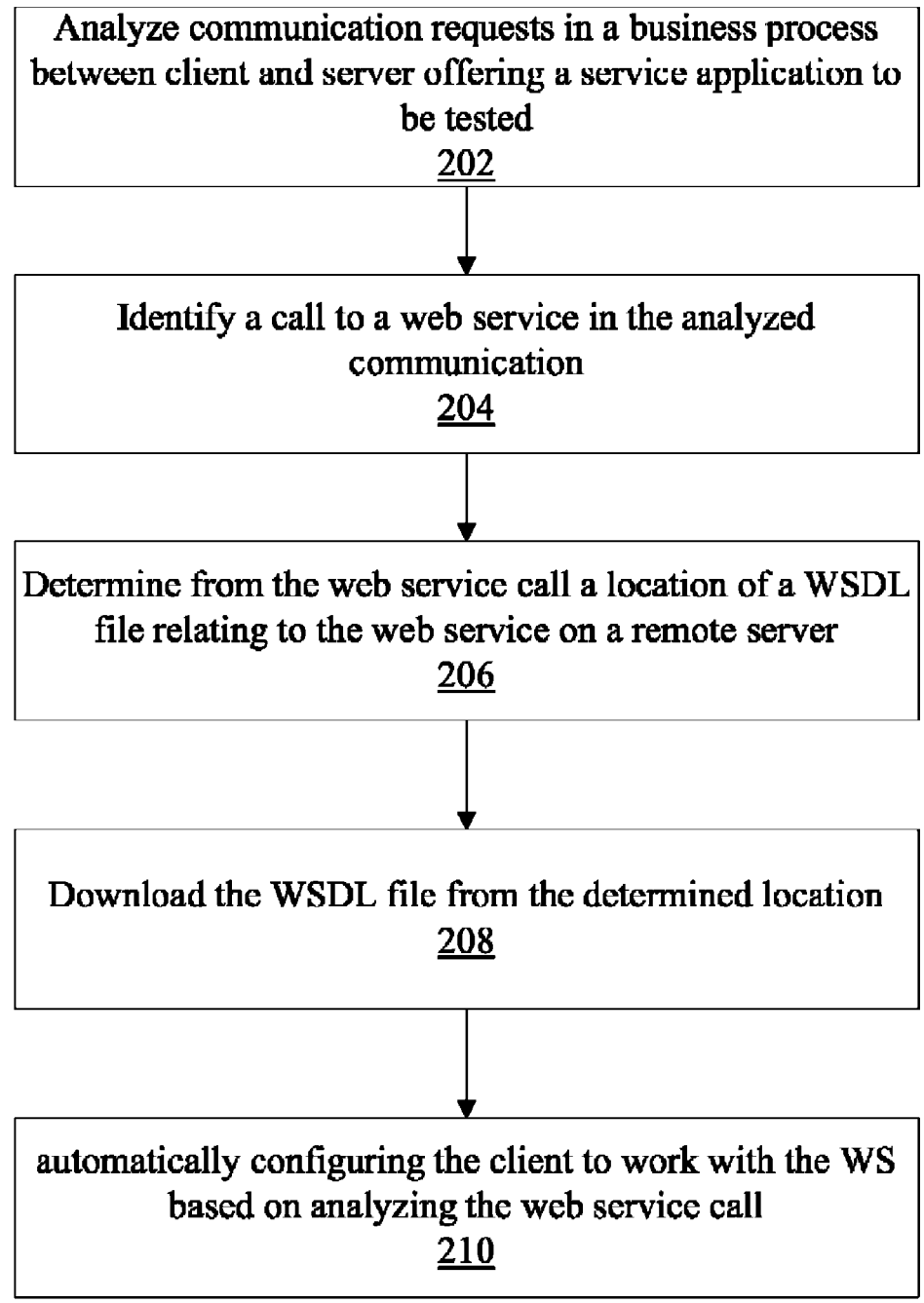
FIG. 2 illustrates a method for automated download and configuration of web-services in a testing tool, in accordance with an embodiment of the present invention.

Reference is now made to FIG. 2 illustrating a method for automated download and configuration of web-services in a testing tool, in accordance with an embodiment of the present invention.

Such method may include analyzing 202 communication requests between a client and an AUT server, which is part of a business process monitored by a testing tool. The method may also include identifying 204 a call to a web service in the analyzed communication requests. The method may further include determining from the web service call the location of a WSDL file relating to the web service on a remote server may be determined 206. Once the location of the WSDL file is determined it may be automatically downloaded 208.

The method may also include automatically configuring 210 the client to work with the WS based on analyzing the web service call.

Figure 3:
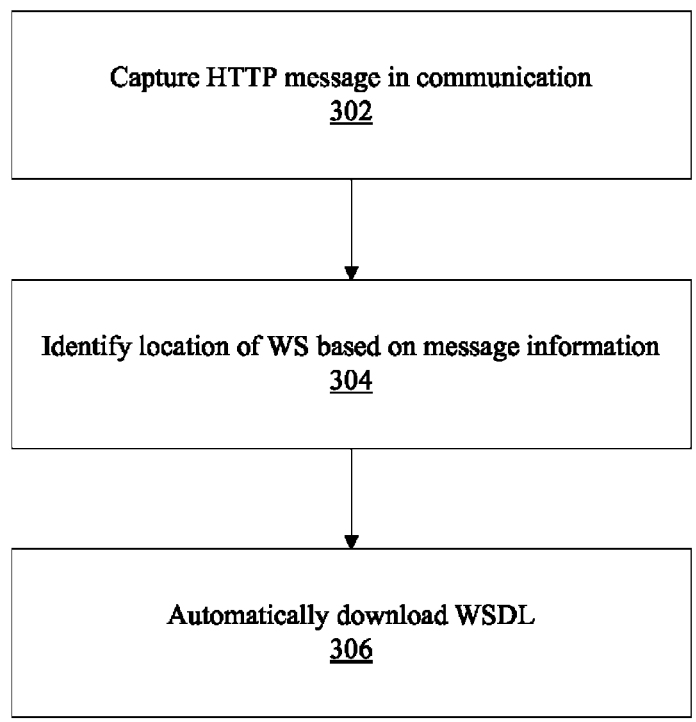
FIG. 3 illustrates a method for automated download of a web-service in a testing tool, in accordance with an embodiment of the present invention.

FIG. 3 illustrates a method for automated download of a web-service in a testing tool, in accordance with an embodiment of the present invention.

For example, such method may include capturing 302 a HTTP message in the communication between a client and a WS server. The location of the WS may be then identified 304 based on message information (for example, by applying heuristics).

Once the location of the WS is determined the appropriate WSDL files may be downloaded 306 to the client.

Figure 4:
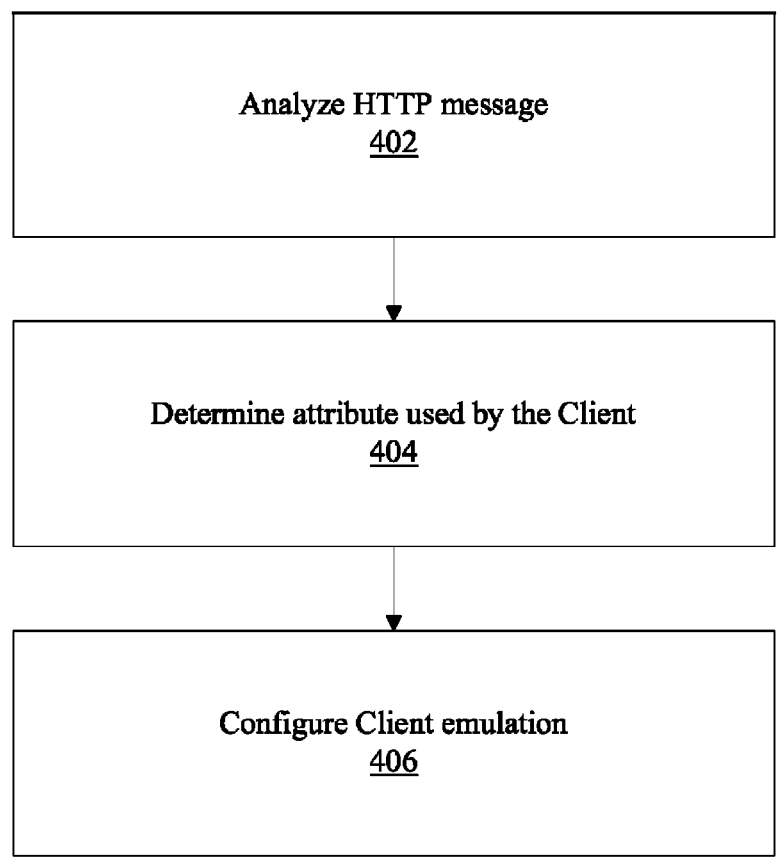
FIG. 4 illustrates a method for automated configuration of a client emulation for work in a testing tool, in accordance with an embodiment of the present invention.

FIG. 4 illustrates a method for automated configuration of client emulation for work in a testing tool, in accordance with an embodiment of the present invention.

The method may include analyzing 402 the communication between a client and an AUT server, for example a HTTP message and determining 404 attribute of that HTTP message. Based on information related to the determined attribute it may be possible to configure the client emulation 406.

The HTTP headers, soap headers and soap body may be analyzed, and the presence of WS standards (public or vendor proprietary) such as WS-Addressing, Windows Communication Foundation (WCF) binary encoding (WCF is a Microsoft web-service technology), WS-Security may be determined. Based on domain knowledge and heuristics it may be possible to determine how these standards were applied on the captured message, and extract these standards. This way the user may be presented with a standards-free message so he can edit it. These standards may also be applied when performing the testing of the AUT.

Figure 5:
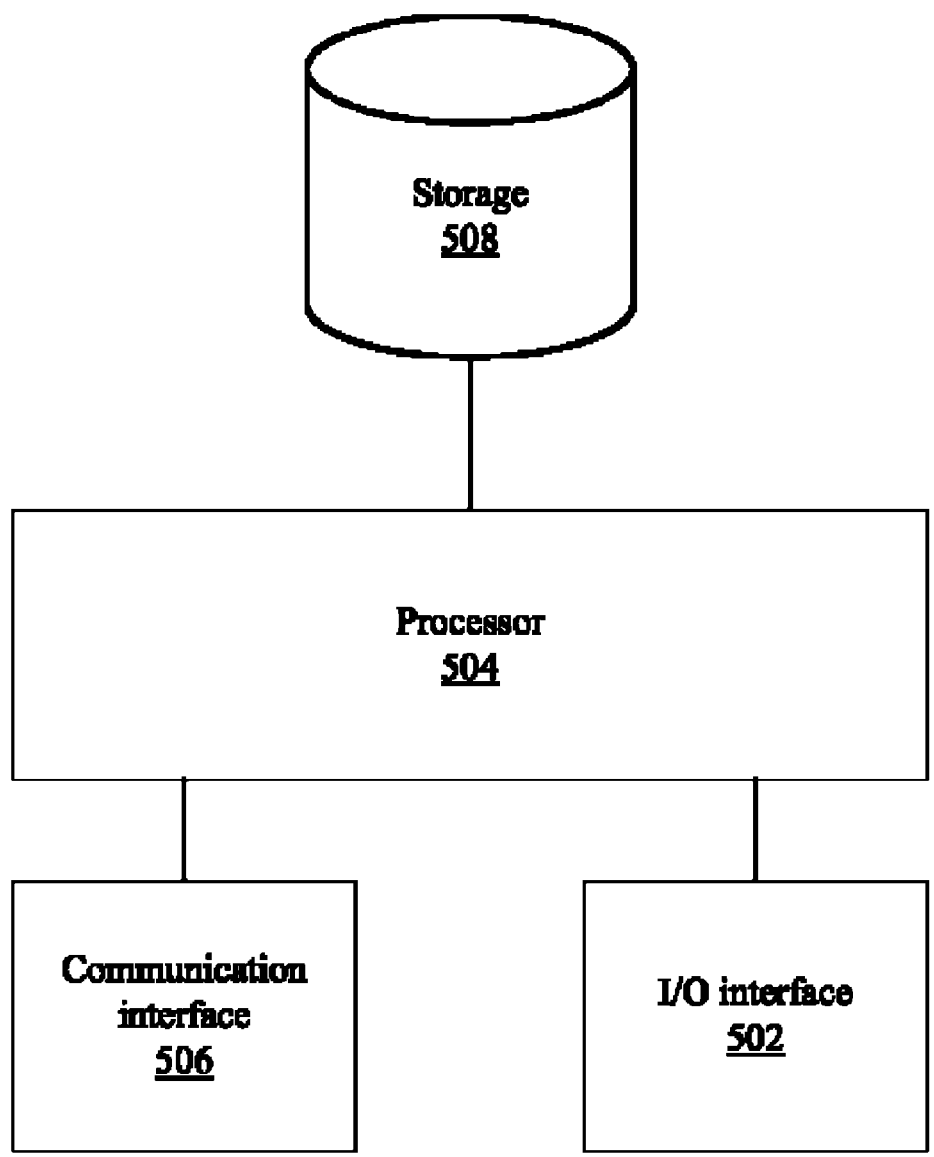
FIG. 5 illustrates a system for automated download and configuration of web-services in a testing tool, in accordance with an embodiment of the present invention.

FIG. 5 illustrates a system for automated download and configuration of web-services in a testing tool, in accordance with an embodiment of the present invention.

The system may include, for example, a computing device which may include a storage device 508 for storing a computer program for testing an AUT server which may include automated download and configuration of web-services. The system may also include a processor 504 for executing the computer program, Input/output (I/O) interface 502 for input and out put and communication interface 506 for communication with other devices (using direct communication or over a network).

Aspects of the present invention may be embodied as a computer program product saved on one or more computer-readable mediums in the form of computer-readable program code embodied thereon. For example, the computer-readable medium may be a non-transitory storage medium. A computer-readable storage medium may be, for example, an electronic, optical, magnetic, electromagnetic, infrared, or semiconductor system, apparatus, or device, or any combination thereof.

Computer program code of the above described embodiments of the invention may be written in any suitable programming language. The program code may execute on a single computer, or on a plurality of computers.

The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

What is claimed is:

1. A method comprising:
analyzing communication requests in a business process between a client and a server offering a service application to be tested;
identifying a call to a web service the said analyzed communication requests;
determining from the web service call a location of a Web Service Description Language (WSDL) file relating to the web service on a remote server by:
analyzing an HTTP message in the communication requests to determine an endpoint of the HTTP message;
removing a port identifier from the HTTP message; and replacing the port identifier with a string to the HTTP message to form an amended endpoint; and
automatically downloading the WSDL file from the location indicated by the amended endpoint.

2. The method of claim 1, further including configuring a client emulation to simulate work load on the server offering the service application to be tested.

3. The method of claim 2, wherein the configuring step includes:
analyzing an HTTP message in the communication requests;
determining one or more web service standards that were applied on the said HTTP message from one or more message attributes; and
configuring the client emulation automatically based on said one or more web service standards.

4. The method of claim 1, in which the string comprises "?wsdl" and is added after a service name in the web service call.

5. The method of claim 1, further comprising identifying which port is used in each web service call by matching the endpoint to the endpoints of ports that are specified in the WSDL file.

6. The method of claim 1, further comprising:
keeping a machine-wide cache of WSDL metadata;
applying heuristics to the cache of WSDL metadata to discover a location of a web service on a remote web service server that receives a stand alone message without metadata, in which applying heuristics comprises:
guessing a metadata address based on a destination URL; and
trying to download the metadata from the guessed metadata address.

7. The method of claim 6, in which keeping the machine-wide cache of WSDL files comprises keeping a local cache on the machine of previously downloaded WSDL files.

8. The method of claim 6, further comprising, if the guess was a false guess, then parsing HTML error messages rendered by the remote web service server.

9. A non-transitory computer readable medium having stored thereon instructions which when executed by a processor cause the processor to perform the method of:
analyzing communication requests in a business process between a client and a server offering a service application to be tested;
identifying a call to a web service in the said analyzed communication requests;

determining from the web service call a location of a Web Service Description Language (WSDL) file relating to the web service on a remote server by:
  removing a port identifier from an HTTP message in the communication requests; and
  replacing the port identifier with a string to the HTTP message to form an amended endpoint;
downloading the WSDL file from the determined, location automatically; and
determining attributes used by the client by:
  downloading additional WSDL files from the client and storing the WSDL files in a local cache; and
  identifying which port is used in the web service call by matching the amended endpoint with endpoints of ports that are specified in the WSDL files.

10. The non-transitory computer readable medium of claim 9, wherein the determining instruction further includes determining a location of a Web Service Description Language (WSDL) file based on a destination indication from the web service call.

11. The non-transitory computer readable medium of claim 9, wherein the analyzing instruction further includes analyzing a HTTP message in the communication requests.

12. The non-transitory computer readable medium of claim 11 wherein the determining instruction further includes determining the location from an endpoint of the HTTP message.

13. The non-transitory computer readable medium of claim 9, wherein further including an instruction for configuring a client emulation to simulate work load on the server offering the service application to be tested.

14. The non-transitory computer readable medium of claim 13, wherein the configuring instruction further includes:
  analyzing an HTTP message in the said communication requests;
  determining one or more web service standards that were applied on the said HTTP message from one or more message attributes; and
  configuring the client emulation automatically based on said one or more web service standards.

15. A computer system comprising:
  a processor configured to:
    write, to a local cache on the computer system, previously downloaded Web Service Description Language (WSDL) files;
    analyze communication requests in a business process between a client and a remote server offering a service application to be tested;
    identify a call to a web service in the said analyzed communication requests;
    determine, from the web service call, a location of a Web Service Description Language (WSDL) file relating to the web service on the remote server by:
      removing a port identifier from an HTTP message in the communication requests; and
      replacing the port identifier with a string to the HTTP message to form an amended endpoint; and
    automatically download the WSDL file from the determined location indicated by the amended endpoint.

16. The computer system of claim 15, wherein determining the location comprises determining a location of a Web Service Description Language (WSDL) tile based on a destination indication from the web service call.

17. The computer system of claim 15, wherein analyzing of the communication requests includes analyzing an additional HTTP message in the communication requests.

18. The computer system of claim 17, wherein determining the location comprises determining the location from an endpoint of the additional HTTP message.

19. The computer system of claim 15, wherein the processor is further configured to configure a client emulation to simulate work load on the server offering the service application to be tested.

20. The computer system of claim 19, wherein in configuring of the client emulation the processor is configured to:
  analyze an HTTP message in the communication requests;
  determine one or more web service standards that were applied on the said HTTP message from one or more message attributes; and
  configure the client emulation automatically based on said one or more web service standards.

21. The computer system of claim 15, wherein the processor is further configured to:
  analyze the HTTP message in the communication requests to determine an endpoint of the HTTP message;
  add a "?wsdl" to an endpoint of the web service call; and
  automatically download the WSDL the file from the determined location.

22. The computer system of claim 15, wherein the processor is further configure to apply heuristics by:
  guessing the web service call location based on information in the previously downloaded WSDL files;
  trying to download the WSDL metadata from the guessed web service call location; and
  if the guess was a false guess, then parsing HTML error messages rendered by the remote server.

* * * * *

UNITED STATES PATENT AND TRADEMARK OFFICE
CERTIFICATE OF CORRECTION

PATENT NO. : 9,043,440 B2  
APPLICATION NO. : 12/970764  
DATED : May 26, 2015  
INVENTOR(S) : Anna Leiba et al.

Page 1 of 1

It is certified that error appears in the above-identified patent and that said Letters Patent is hereby corrected as shown below:

In The Claims

In column 6, line 12, in Claim 1, delete "the" and insert -- in the --, therefor.

In column 7, line 8, in Claim 9, delete "determined," and insert -- determined --, therefor.

In column 8, line 13, in Claim 16, delete "tile" and insert -- file --, therefor.

In column 8, line 39 approx., in Claim 21, delete "the file" and insert -- file --, therefor.

In column 8, line 41 approx., in Claim 22, delete "configure" and insert -- configured --, therefor.

Signed and Sealed this  
Sixteenth Day of February, 2016

Michelle K. Lee  
*Director of the United States Patent and Trademark Office*